(12) United States Patent
Buurma

(10) Patent No.: US 6,345,971 B1
(45) Date of Patent: Feb. 12, 2002

(54) DEVICE FOR DIVIDING DOUGH

(75) Inventor: Arend Leendert Buurma, Uden (NL)

(73) Assignee: Johan Hendrik Bernard Kaak (NL)

( * ) Notice: Subject to any disclaimer, the term of this patent is extended or adjusted under 35 U.S.C. 154(b) by 0 days.

(21) Appl. No.: 09/582,972

(22) PCT Filed: Jan. 8, 1999

(86) PCT No.: PCT/NL99/00010

§ 371 Date: Aug. 14, 2000

§ 102(e) Date: Aug. 14, 2000

(87) PCT Pub. No.: WO99/34681

PCT Pub. Date: Jul. 15, 1999

(30) Foreign Application Priority Data

Jan. 8, 1998 (NL) ............................................. 1007981

(51) Int. Cl.[7] ................................................. A21C 5/02
(52) U.S. Cl. ...................................... 425/104; 425/238
(58) Field of Search ............................. 425/91, 92, 96, 425/98, 102, 103, 238, 239, 104

(56) References Cited

U.S. PATENT DOCUMENTS

| | | | | |
|---|---|---|---|---|
| 798,361 A | * | 8/1905 | Morton | |
| 1,522,021 A | * | 1/1925 | May | |
| 1,704,903 A | * | 3/1929 | Russell | |
| 2,000,512 A | * | 5/1935 | Eggert | |
| 2,280,834 A | * | 4/1942 | Kocher | |
| 3,481,283 A | * | 12/1969 | Vogt | |
| 3,773,448 A | * | 11/1973 | Poot | 425/96 |
| 4,689,856 A | * | 9/1987 | Gibson | |
| 5,503,861 A | * | 4/1996 | Atwood | 425/238 |

FOREIGN PATENT DOCUMENTS

| | | | |
|---|---|---|---|
| DE | 474276 | | 3/1929 |
| DE | 1258811 B | * | 1/1968 |
| DE | 2159799 A | * | 6/1973 |
| NL | 7701406 A | * | 9/1977 |
| NL | 7604941 A | * | 11/1977 |

* cited by examiner

*Primary Examiner*—Robert Davis
(74) *Attorney, Agent, or Firm*—Howard & Howard

(57) ABSTRACT

Device for dividing dough provided with a dough funnel, a division slide which slide can move to and fro, a piston for moving dough which piston can move to and fro situated below the division slide, a measuring chamber which can move up and down with at least two measuring spaces for receiving the dough moved by the movable piston which spaces are situated next to each other and separated from each other by a partition. The measuring chamber is movable to a bottom position and has measuring pistons for pushing the dough out of the measuring spaces. Knife for scraping the pieces of dough from the measuring pistons. The device is provided with a number of sprinklers at least being equal to the number of partitions, for sprinkling liquid on parts of the pieces of dough facing each other that are pushed out of the measuring spaces.

4 Claims, 4 Drawing Sheets

Figure 1:
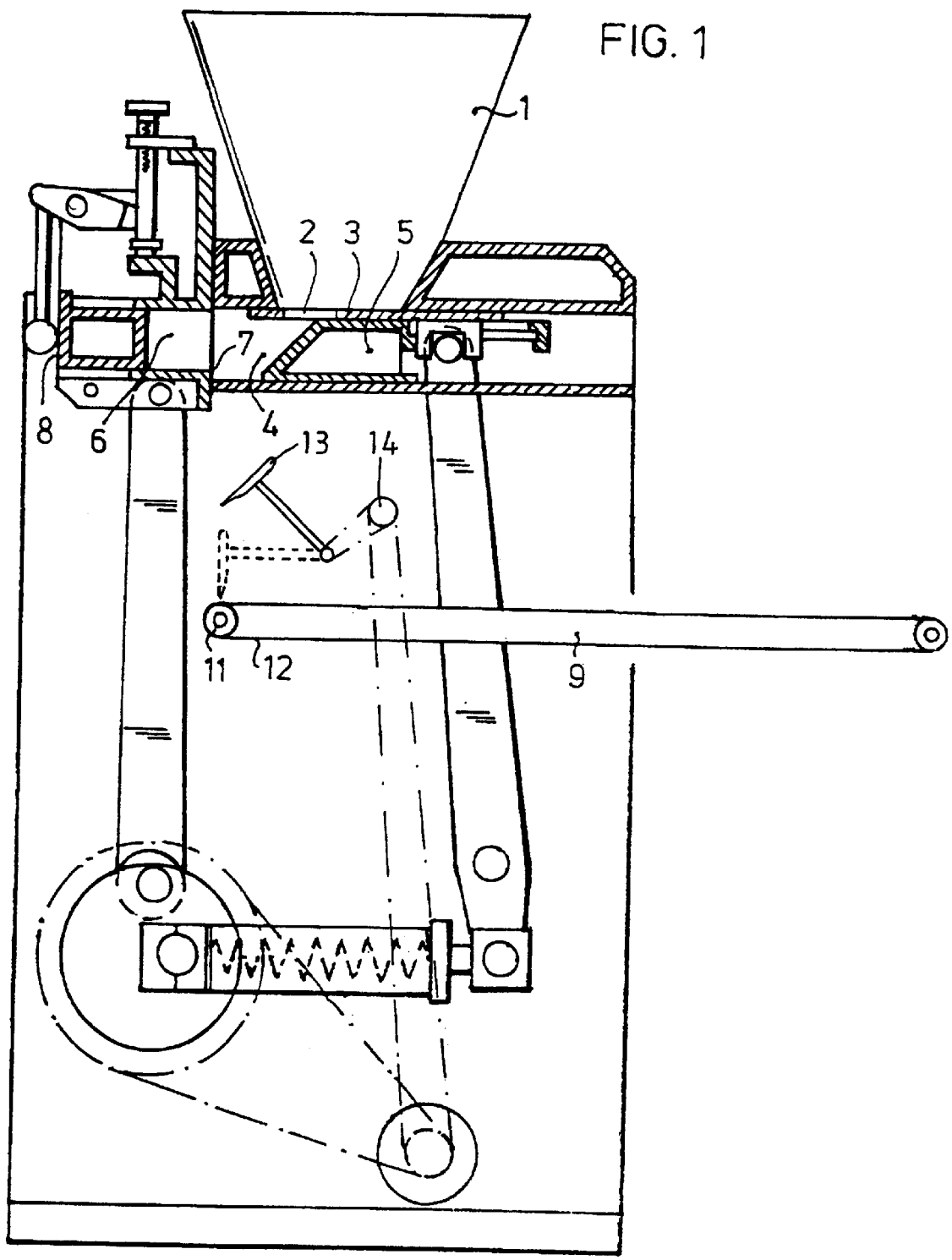

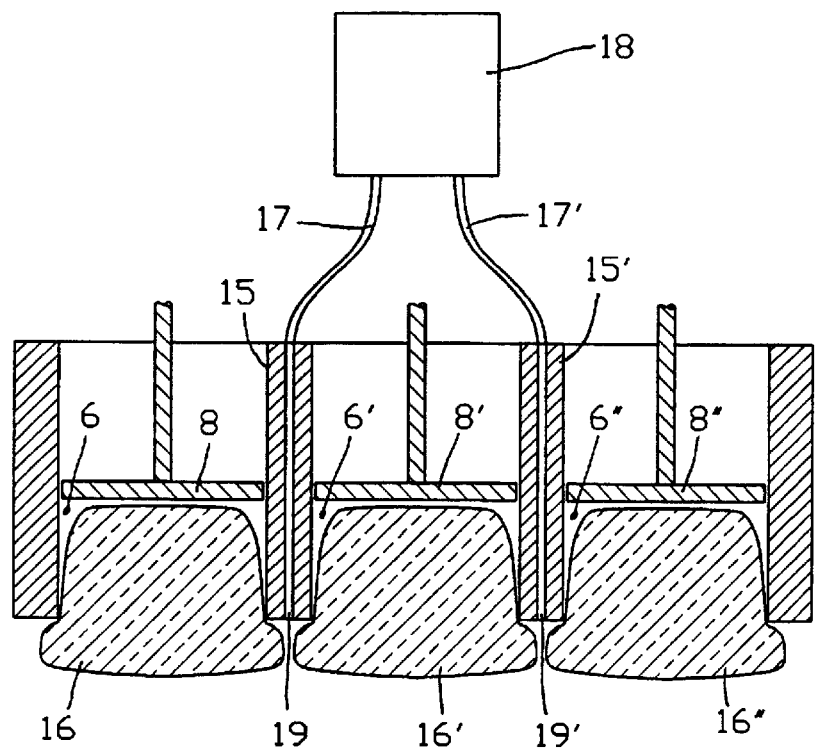
FIG. 4
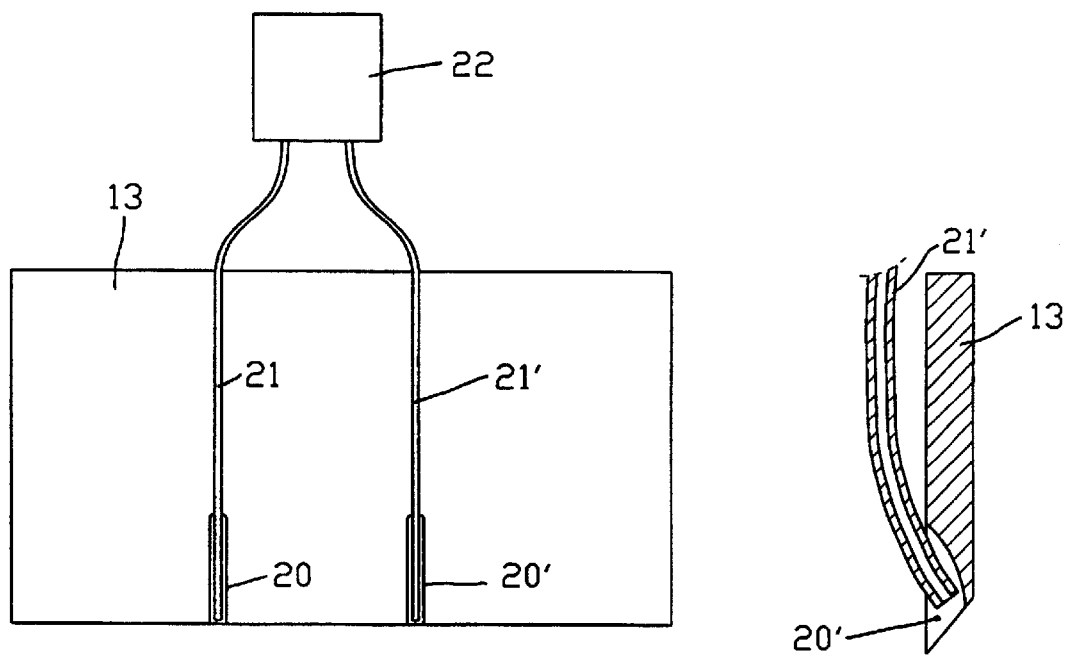
FIG. 5
FIG. 6

DEVICE FOR DIVIDING DOUGH

The present invention relates to a device for dividing dough provided with a dough funnel, a division slide for closing off the bottom opening of the dough funnel which slide can move to and fro, a piston for moving dough which piston can move to and fro situated below the division slide, a measuring chamber which can move up and down with at least two measuring spaces for receiving the dough moved by the movable piston which spaces are situated next to each other and separated from each other by a partition, the measuring chamber being movable to a bottom position and having a measuring chamber bottom and measuring pistons for pushing the pieces of dough out of the measuring spaces, and a knife for scraping the pieces of dough from the measuring piston.

In known devices for dividing dough of the kind described above it is desirable to design the partitions between the measuring spaces as thin as possible, as not only the filling of the measuring spaces with dough can take place with relatively little pressure and thus a more dough friendly treatment, which improves the final product, is provided, but also a high accuracy of the quantity and the weight of the pieces of dough can be obtained. As a result of the small distance between the adjacent measuring spaces it may however occur that the pieces of dough pushed out of the measuring spaces contact each other and stick together, which has a detrimental effect on the further course of the dough treatment.

In order to solve this problem of pieces of dough pushed out of the measuring space sticking together, a device is described in German Patent specification 474.276 in which pieces of dough are not pushed out of the measuring spaces simultaneously, but with such a time difference that the problem of sticking together no longer occurs. Not only is a complicated construction needed to that end, but the number of pieces of dough supplied per time unit is also reduced. Additionally from the German Auslegeschrift 1.258.811 a device for dividing dough is known provided with a casting roll, in which the casting roll is provided with sub areas with a different shape belonging to the different measuring spaces, as a result of which each piece of dough simultaneously pushed out in relation to the other pieces of dough performs a different casting movement, so that the problem of sticking together does not occur. This additional casting roll does not only require regular extra cleansing and servicing but in some embodiments does not cast the pieces of dough on a conveyor belt in a position which is optimal for further dough treatment.

It is an object of the present invention to provide a device for dividing dough in which the number of pieces of dough delivered per time unit is relatively large, in which no detrimental extra servicing is necessary and in which the further dough treatment is not by detrimentally affected.

To that end a device of the kind described above according to the invention is characterized in that the device is provided with a number of sprinklers, the number at least being equal to the number of partitions, for sprinkling liquid on parts of the pieces of dough facing each other that are pushed out of the measuring spaces. Because the sprinklers sprinkle liquid on the parts of pieces of dough facing each other that are pushed out of the measuring spaces, the pieces of dough contacting each other do not or hardly stick together, depending on the kind of liquid used. So the pieces of dough can be pushed out of the measuring spaces simultaneously, as a result of which the capacity is not detrimentally affected, in which also the sprinklers in comparison to the other parts of the device require no extra servicing. Moreover the sprinklers can be arranged in a simple manner in existing devices for dividing dough.

In order to keep the device for dividing dough compact a sprinkler is integrated in each partition. Alternatively or additionally at least a part of the sprinklers is integrated in the knife.

Although the sprinklers may sprinkle foodstuff friendly oil as liquid, it appeared that when the sprinklers are water sprinklers a sufficient degree of not sticking together of the pieces of dough is already obtained, in which the water used by the sprinklers is relatively cheap.

Some embodiments of a device for dividing dough according to the invention will by way of example be described on the basis of the drawing.

Figure 2:
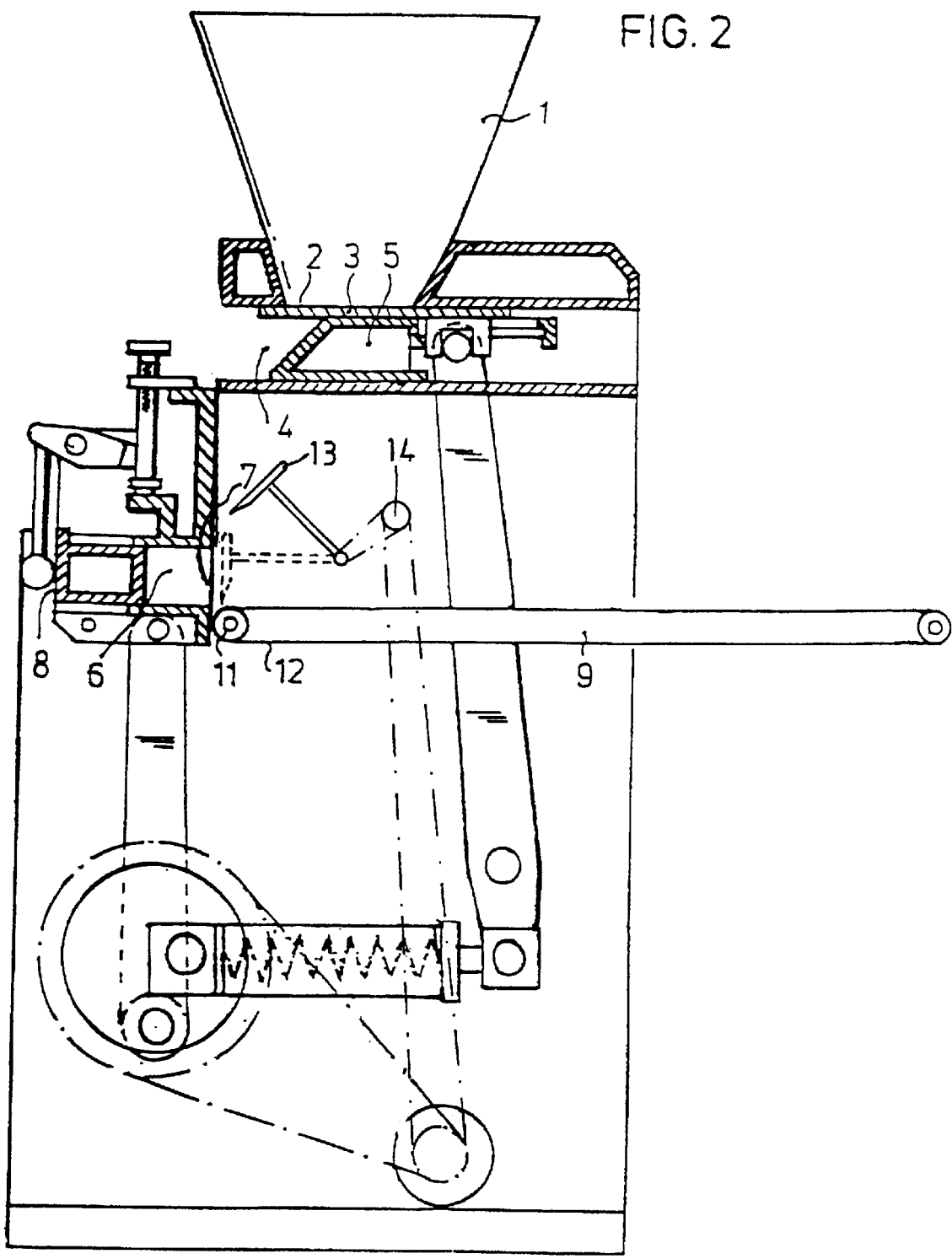
Figure 3:
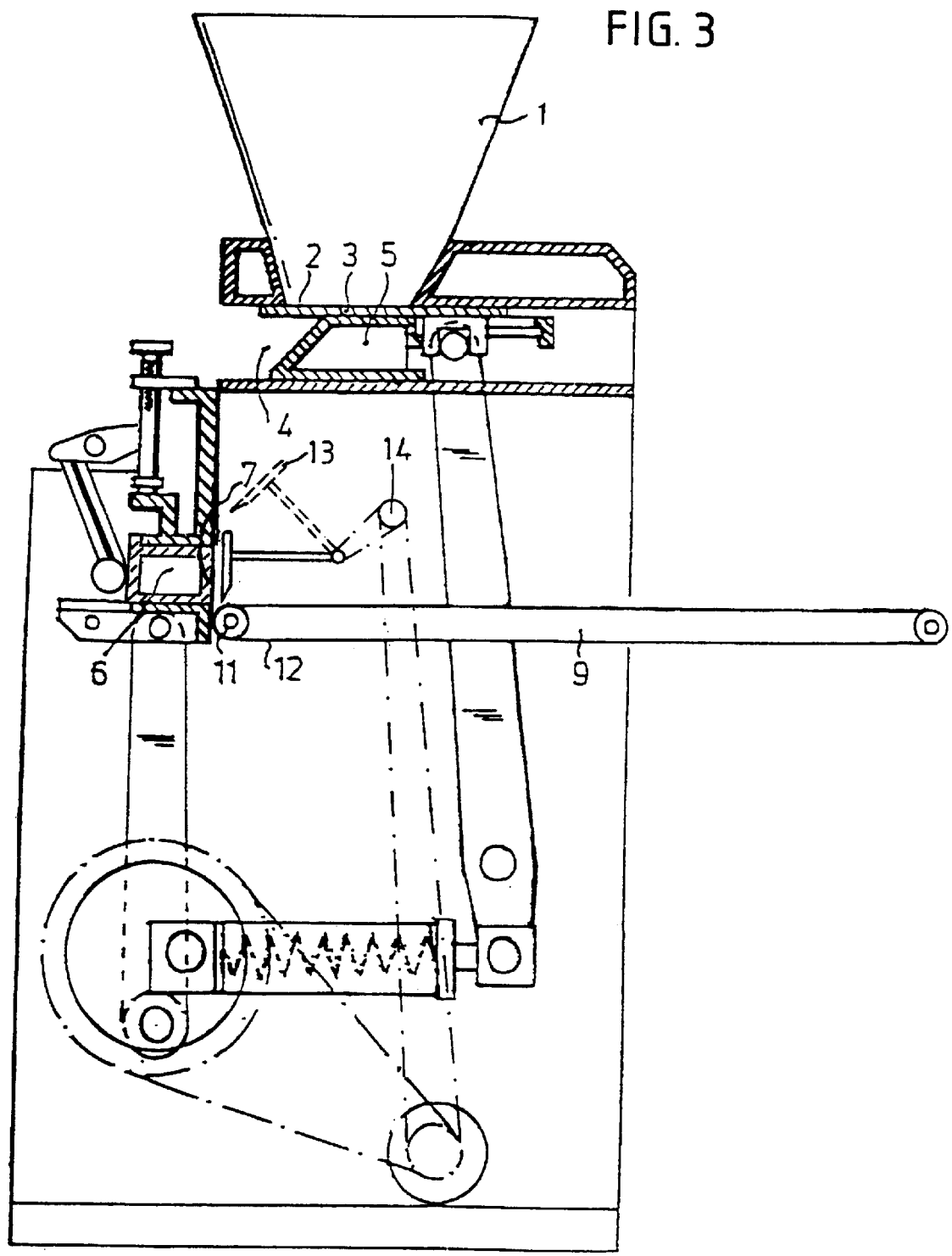

FIGS. 1–3 schematically elucidate the working of a device for dividing dough according to the invention.

FIG. 4 shows a schematical cross-section of a part of the device according to the invention in which the sprinklers are integrated in the partitions of the measuring chamber.

FIG. 5 schematically shows a view of a knife of a device according to the invention with integrated sprinklers, and FIG. 6 schematically shows a cross-section of a part of FIG. 5.

As devices for dividing dough, also called weighers or measurers, have been used for a long time already, only those parts of the device that are necessary for the understanding of the invention will be described in short.

The device for dividing dough according to the invention, as schematically shown in side view in the figures, is provided with a dough funnel 1 for receiving the dough to be divided, which dough funnel 1 has a bottom opening 2. A division slide 3 which can move to and fro closes off the bottom opening 2 of the dough funnel 1 in the shown position, and when retracted permits the dough from the dough funnel 1 to end up in a dough bed 4. The division slide 3 also has the function of separating the dough in the dough bed 4 from the dough in the dough funnel 1. A piston 5 placed under the division slide 3, which piston moves to and fro, moves the dough in the dough bed 4 until in a measuring chamber with at least two measuring spaces situated next to each other of which one 6 can be seen in the figure, which measuring chamber can be moved up and down. In FIG. 1 the measuring chamber takes its top position and in FIG. 2 its bottom position. The measuring chamber further comprises a measuring chamber bottom 7 and measuring pistons 8 for pushing the pieces of dough out of the measuring spaces. Adjacent measuring spaces are separated one from the other by a partition.

The device for dividing dough usually comprises a conveyor belt 9 with a carrier surface 12 and a receiving end 11 for receiving the pieces of dough pushed out of the measuring spaces. The conveyor belt 9 is usually followed by a number of pitch correction belts for placing the pieces of dough on desired distance one from the other for further dough treatment.

In the embodiment shown (see FIG. 2) the receiving end 11 is situated next to the measuring chamber which is in its bottom position, in which the carrier surface 12 of the conveyor belt 9 is situated at the level of the measuring chamber bottom 7. In this way the pieces of dough can be pushed out of the measuring spaces and end up on the carrier surface 12 of the conveyor belt 9 without falling, which leads to a uniform shape of the pieces of dough placed on the conveyor belt 9.

When the measuring chamber takes its bottom position the measuring pistons 8 push the pieces of dough out of the measuring spaces after which a knife 13 driven by a actuator 14 scrapes the pieces of dough from the measuring pistons 8. Although in the figures a knife is shown which can be moved up and down, a stationary knife can also be used, as described in German Auslegeschrift 1.258.811, which scrapes the pieces of dough from the measuring pistons when the measuring chamber moves to its top position.

According to the invention the device for dividing dough comprises a number of sprinklers, in which the number of sprinklers is at least equal to the number of partitions. The sprinklers sprinkle liquid on the parts of the pieces of dough facing each other that are pushed out of the measuring spaces, so that the pieces of dough, which when coming out of the measuring space tend to expand a little, do not stick together when abutting each other.

An exemplary embodiment of a device according to the invention is schematically shown in FIG. 4. In this exemplary embodiment the sprinklers have been integrated in the partitions 15 and 15' of the measuring chamber. The sprinklers are formed by channels 19 and 19' arranged in the partitions 15 and 15', which channels are connected to a liquid reservoir and for instance a compressed air means, by means of flexible liquid pipes 17, 17', in its entirety indicated with 18. When the measuring pistons 8, 8', 8" push the pieces of dough 16, 16', 16" out of the measuring spaces 6, 6', 6" the liquid is squirted through the liquid pipes 17, 17' and the channels 19, 19' and ends up on the parts of the pieces of dough 16, 16', 16" facing each other that are pushed out of the measuring spaces 6, 6', 6" so that they do not stick together. Because the liquid is guided through the pipes and channels, for instance by compressed air, they are automatically cleansed.

Alternatively or additionally, as schematically shown in FIGS. 5 and 6, the sprinklers can be arranged on the knife 13. To that end the knife 13 is provided with recesses 20, 20' in which the extremities of flexible liquid pipes 21, 21' are attached, which are connected with a liquid reservoir and, for instance a compressed air means, in its entirety indicated with 22. When the knife 13 scrapes along the measuring pistons which have pushed pieces of dough out of the measuring spaces, the extremities of the liquid pipes 21, 21' pass along the partitions concerned and sprinkle liquid on the parts of the pieces of dough facing each other. Although the pieces of dough may already abut each other liquid will also end up between the parts of the pieces of dough abutting each other as a result of capillary effect, as a result of which sticking together is ended or prevented. Because the extremities of the liquid pipes 21, 21' lie in the recesses 20, 20' of the knife 13, the relative movement of the knife in relation to the measuring pistons is not detrimentally affected.

In practice it appeared that sprinklers which sprinkle foodstuff friendly oil are extremely suitable, although oil among others has the disadvantage to be relatively expensive. The sticking together of the pieces of dough in many cases appear to be sufficiently counteracted when the sprinklers are water sprinklers.

What is claimed is:

1. A device for dividing dough comprising: a dough funnel, a division slide for closing off a bottom opening of the dough funnel, the slide movable to and fro, a movable piston for moving dough, the piston movable to and fro and situated below the division slide, a measuring chamber movable up and down and having at least two measuring spaces for receiving dough moved by the movable piston, the spaces situated next to each other and separated from each other by a partition, the measuring chamber being movable to a bottom position and having a measuring chamber bottom and measuring pistons for pushing the pieces of dough out of the measuring spaces, and a knife for scraping the pieces of dough from the measuring piston, characterized in that the device includes a number of sprinklers, the number at least being equal to the number of partitions, for sprinkling liquid on parts of the pieces of dough facing each other that are pushed out of the measuring spaces.

2. Device according to claim 1, characterized in that a sprinkler is integrated in each partition.

3. Device according to claim 1, characterized in that at least a part of the sprinklers is integrated in the knife.

4. Device according to claim 1, characterized in that the sprinklers are water sprinklers.

* * * * *